UNITED STATES PATENT OFFICE.

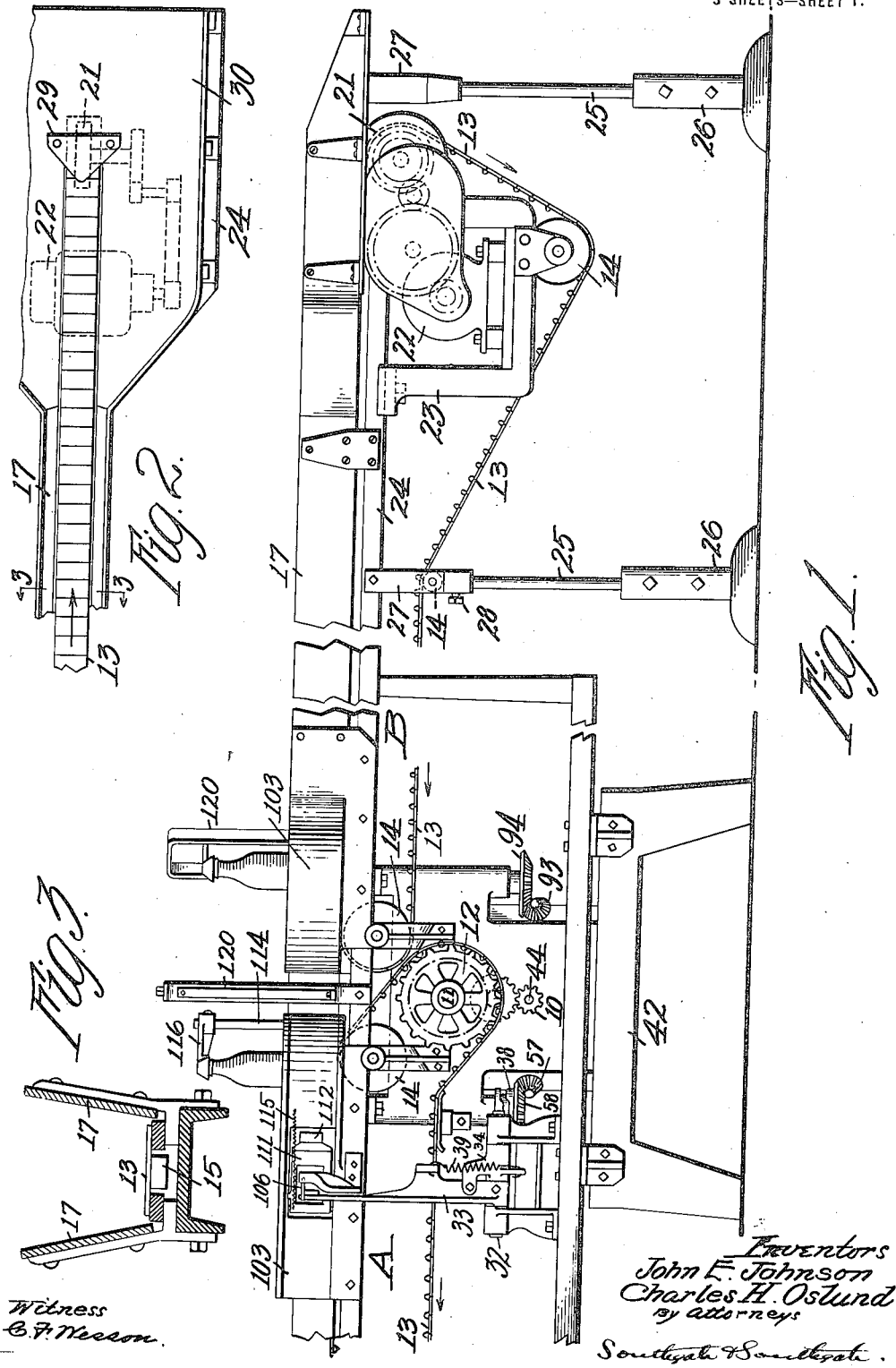

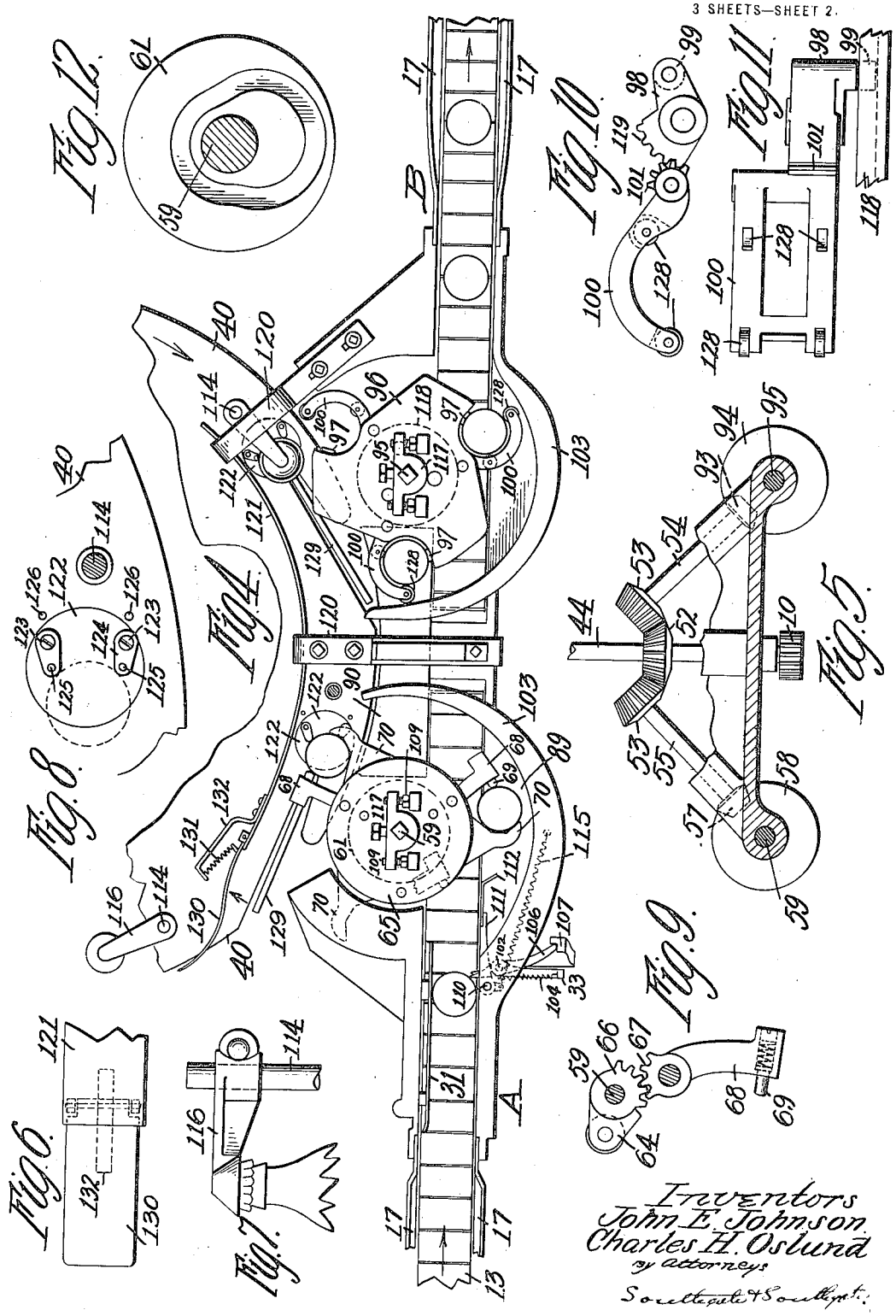

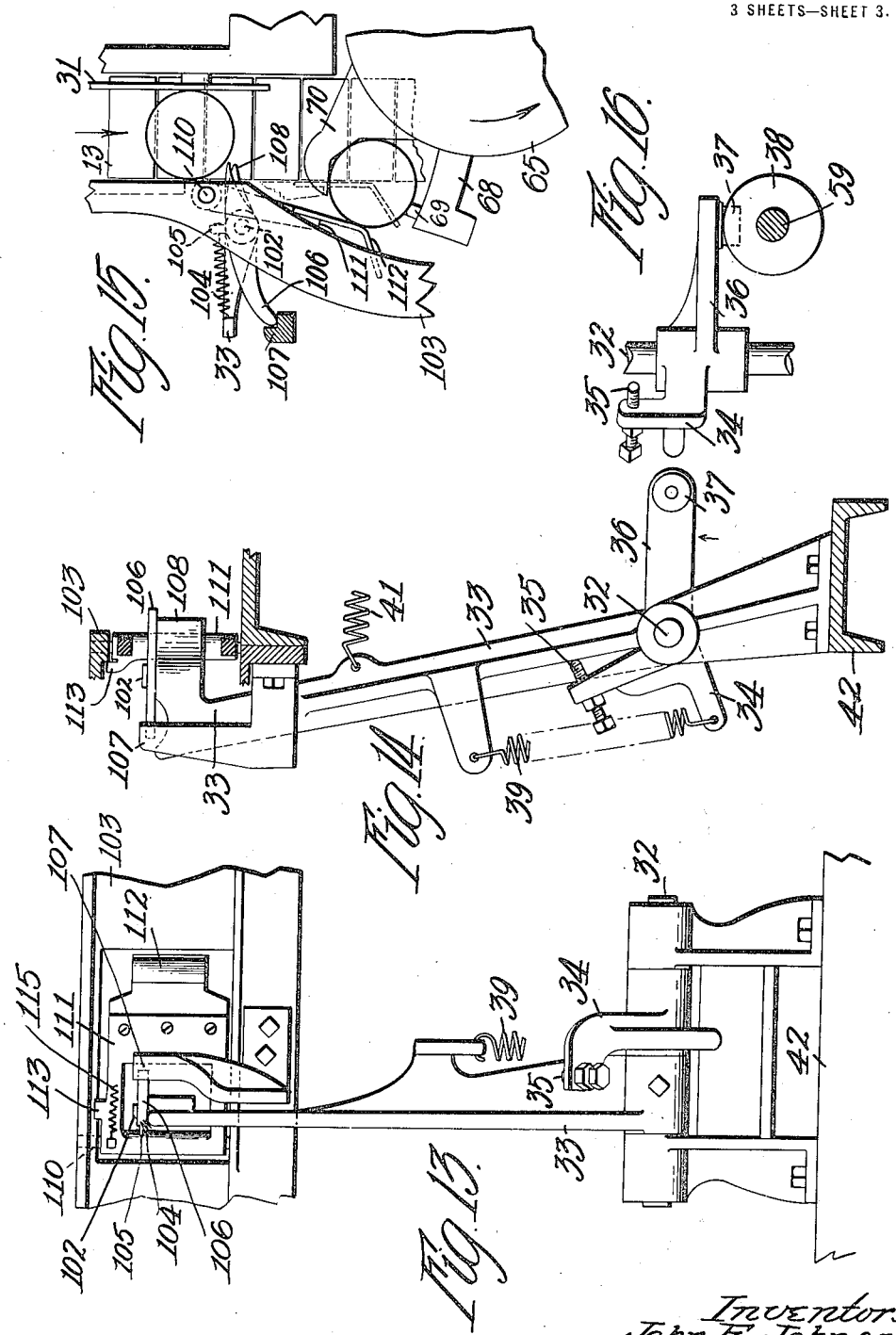

JOHN EMANUEL JOHNSON AND CHARLES H. OSLUND, OF WORCESTER, MASSACHUSETTS, ASSIGNORS TO THE O. AND J. MACHINE COMPANY, OF WORCESTER, MASSACHUSETTS, A CORPORATION OF MASSACHUSETTS.

CONVEYING DEVICE.

1,300,406.  Specification of Letters Patent.  Patented Apr. 15, 1919.

Application filed August 2, 1916. Serial No. 112,705.

*To all whom it may concern:*

Be it known that we, JOHN EMANUEL JOHNSON and CHARLES H. OSLUND, said JOHNSON being a subject of the King of Sweden, said OSLUND a citizen of the United States, both residing at Worcester, in the county of Worcester and State of Massachusetts, have invented a new and useful Conveying Device, of which the following is a specification.

This invention relates to a conveying device capable of general use, but particularly suited for conveying bottles to and from a rotary labeling table, and constitutes an improvement over the machine shown and described in our Letters Patent, No. 1,245,730 of November 6, 1917, filed Oct. 22, 1915.

The principal objects of this invention are to provide means whereby the mechanism for feeding the bottles to the table can be run separately from the mechanism for feeding them from it so that the latter can be operated a little faster, so as to prevent congestion; to provide the conveyer with side guides suitable for keeping the bottles in proper position and permit paper covers to be placed on the bottles; to provide means whereby whenever a bottle is located on the table but is not clamped thereon, as for example if it is broken, it will be forced off the table and prevented from going through the labeling mechanism; to provide the table with a replaceable support for each bottle; to provide means whereby the feeding of the bottles to the rotating head for moving them on the labeling table will be rendered accurate and they will be spaced at uniform distances apart; to provide means in connection therewith whereby when a bottle is not presented by the conveyer in position to be fed to the table at the proper time the mechanism will so act that a bottle coming into position a little later will be held back throughout a complete cycle of operations so that it will be delivered by the conveyer at the proper time; to provide improvements in the details of the mechanism for accomplishing these results; to provide an improved means for assisting in holding the bottle in position while the rotating turret grips it preparatory to feeding it to the labeling table; to provide improvements in both the feeding and delivering turrets shown in our above identified application, and to provide improvements in the details of the mechanism connected with the conveying device thereof. Further objects and advantages of the invention will appear hereinafter.

Reference is to be had to the accompanying drawings in which—

Figure 1 is a side elevation of a conveying mechanism constructed in accordance with this invention;

Fig. 2 is a plan of a portion of the delivering device thereof;

Fig. 3 is a sectional view on enlarged scale on the line 3—3 of Fig. 2;

Fig. 4 is a plan of the parts shown in Fig. 1, showing their relationship to the rotary labeling table;

Fig. 5 is a horizontal sectional view below the table, showing driving connections which can be used;

Fig. 6 is an elevation looking in the direction of the arrow at the left of Fig. 4 of the device for discharging improperly gripped bottles;

Fig. 7 is a side elevation of the gripper;

Fig. 8 is a plan of a portion of the table showing a removable supporting plate for the bottles;

Fig. 9 is a horizontal sectional view of the shafts of the receiving turret, showing the movable members in plan;

Fig. 10 is a plan of the corresponding parts of the delivering turret;

Fig. 11 is an elevation of the latter;

Fig. 12 is a plan of the controlling cam for the same;

Fig. 13 is an elevation of the mechanism for controlling the feed of the bottles to the feeding turret;

Fig. 14 is an end elevation of the same;

Fig. 15 is a plan of parts shown in Fig. 1, but in a different position illustrating the mechanism shown in Figs. 13 and 14, and Fig. 16 is a plan of the mechanism at the bottom for operating these elements, a vertical shaft being shown in section.

In the form shown, which is designed as a bottle labeling machine, a main frame 42 is provided which carries a rotary labeling table 40, a feeding conveyer A, and a delivering conveyer B. The main drive shaft 44 is operated in any desired way, and as in our above identified application, is shown as provided with a beveled pinion 52 meshing with two pinions 53 on shafts 54 and 55 respectively. The shaft 55 through pinion 57 and gear 58 drives a vertical shaft 59 carrying the feeding turret 65. The shaft 54 through pinion 93 and gear 94 drives a vertical shaft 95, on which the latter gear is fixed, and which carries the delivering turret 96.

On the shaft 44 is a gear or pinion 10 which, by means of suitable gearing, drives a shaft 11 having a sprocket wheel 12 thereon which operates a sprocket chain 13. This chain passes over idlers 14 and over a sprocket wheel at the other end, not shown. This chain is shown as made up of a plurality of links each having a hook 15 at one end, and a slot at the other for receiving the next hook, and it constitutes the feeding conveyer A, each link having a flat main portion, which taken together constitute the floor of the conveyer. This conveyer passes horizontally along a course which is bounded by slanting walls 17 constituting a guideway. Although no separate illustration is made of these walls, they may be the same as those shown in Fig. 3. It will be seen that this conveyer passes from a supply point, not shown, to a point near the center of the machine where the upper strand of the conveyer is then brought downwardly around the sprocket wheel 12. It constitutes nothing but a feeding conveyer and takes no part in the delivery of the bottles from the machine. Inasmuch as the delivering conveyer B is so much like the feeding conveyer A we will now describe that.

This consists of an endless chain 13 made up of links the same as those above described and running between side walls 17, as above described. It is located in line, preferably with the feeding conveyer. It passes around a sprocket wheel 21 and idlers 14. The sprocket wheel 21 is operated from the shaft of the motor 22 through gearing as indicated in Figs. 1 and 2. This motor and the gearing are supported on a bracket 23 carried by the frame 24 which supports this conveyer. This frame is carried adjustably on vertical rods 25 mounted on standards 26, the adjustment being made by means of bosses on brackets 27 extending down from the frame 24 and set screws 28 for fastening the parts in adjusted positions. It will be seen from what has been said that this delivering conveyer is complete in itself, that its motor is self-contained and can be stopped independently of the feeding conveyer and run at a different speed, as may be desired. Making it independent of the other is a convenient matter for these reasons, and because under different conditions the delivering conveyer will be of different lengths and designs.

While speaking of the delivering conveyer we will call attention to the deflector 29 located on the floor of the frame 24 centrally over the conveyer. It is to deflect part of the bottles to one side and part to the other side of this widened floor 30 which is so arranged as to receive and hold a large number of them so that an attendant need not be constantly on the look-out, but can gather them up at intervals.

Coming back now to the feeding conveyer it will be seen that a guide 31 is shown along one side of the conveyer for forcing the bottles over to one side and making them pass near the end of their travel in a definite path. It will be understood that before reaching this point there is some latitude. As will be understood from reference to the prior case above mentioned, the bottles are fed from this conveyer to a turret mounted on the shaft 59 which feeds them to the rotary labeling table 40.

In order to feed the bottles accurately and at proper intervals apart to this turret, the following mechanism is provided. On the frame 42 is mounted an oscillatable rod 32. On this is keyed or fixed an arm 33 standing upwardly. A set screw is shown for fastening it to the rod or shaft 32. Freely pivoted on this rod is a bracket 34 having an adjustable stop screw 35 thereon for engaging the arm 33 and causing it to partake of its motion. This bracket 34 is provided with a fixed arm 36 extending in the oposite direction and having a roll 37 thereon engaging a cam 38 mounted on the shaft 59. This cam raises and lowers the arm 36 and rocks the bracket 34 about the shaft 32 at regular intervals.

In the form shown this rocking motion is accomplished three times during each complete revolution of the shaft 59. The result of this rocking motion is to force the arm 33 forward each time the roll 37 is pulled down. A spring 39 keeps the arm 33 back in contact with a screw 35. Another spring 41 holds the arm in the opposite position except when the spring 39 is stretched by the motion of the bracket 34.

The arm 33 is provided near its top with a stud 102. A spring 104, connected with the arm 33 and with a projection 105 on a latch 106 is pivoted on this stud 102 and tends to hold this latch in a certain position. The latch has a tail which is adapted to move over a tooth 107 on a fixed bracket. When the arm 33 rocks inwardly toward the conveyer, as it normally does three times during each rotation of the shaft 59, the latch 106 moves beyond the tooth 107 into the position shown in Fig. 15, and locks the arm 33 in that position so that the next time the roll 37 is raised the screw 35 will simply move back away from the arm 33 extending the spring 39, but will not take the arm with it. When a bottle engages the latch 106, as indicated in Fig. 15, the latch will be forced to turn about its pivot 102 out of the position shown in that figure and unlock the arm 33. Then the projecting end 108 on the arm 33 is withdrawn by the cam 38 the next time that comes around to the proper position to accomplish this result. Therefore the bottle will be fed forward at exactly the proper time to be taken up by the turret.

It will be obvious from the above that whenever a bottle fails to come into proper position to release the latch 106 the projecting end 108 of the arm 33 will not be withdrawn, but will be held in place by the spring 41; consequently a bottle coming along in the middle of an interval cannot be fed past this projection, but will have to wait until the next operation of the arm 36. In this way the feed of the bottles is properly timed, and there is no danger of feeding more than one at a time, or feeding one when it cannot be taken care of by the machinery to which it is being fed.

The guide 103 is also provided with a vertical stud 110 on which is pivotally mounted an arm 111 having a bent spring 112 on the end. This arm and its spring are arranged to lie in the line of one wall of the conveyer frame so as to receive the bottle against them, and in fact they constitute that wall at this point. This arm is provided with a projection 113 engaging the top of the frame so as to keep it from moving inwardly beyond the line of that wall, and a spring 115 is provided for always forcing this arm back into its inward limiting position.

These parts are designed for coöperating with the feeding turret 65 which operates in a manner similar to the one shown in our above identified application, but this turret, instead of having all movable arms, is provided with a series of arms 70, three in number in the present case, which are rigidly fixed on the turret head 65. It is to coöperate with these arms that the yielding arm 111 is provided. As the turret comes around one of the arms 70 engages the bottle, moved up into proper position by the combined operation of the conveyer and timing mechanism, and the arm 111 yieldingly holds the bottle against the concave surface of the arm 70 while that rotates around and until the bottle is clamped to it by mechanism to be described.

This clamping mechanism consists of a series of arms 68 each having a spring-pressed plunger 69 thereon. Each of these arms has a rack surface or fixed gear segment 67 which meshes with a similar segment 66 loosely mounted on the shaft 59 and operated by a roll carried by an arm 64 fixed with respect to the segment 66. A cam 61 is provided for operating these rolls and gripping devices, as in our above identified application.

We have not heretofore described the turret in full because we have changed the same by adding an adjusting device. In our above identified application, the turret head was fixed on the shaft 59 but in this case it is loosely mounted on it and a yoke 117 is fixed on this shaft. The turret head is provided with a pair of adjusting screws 109 which are adapted to be adjustably connected with the yoke 117 to vary as may be desired the angular relation between the turret head and the shaft.

The operation of the turret for the purpose of transporting the bottles from the conveyer A to the bottle labeling table 40 is similar to the operation of our above identified case, and need not be described in detail. It will be understood, of course, that in moving to this position it passes the bottle over plates 89 and 90, and is guided by an arc-shaped guide 103 and that similar conditions prevail on the other side where the bottle is delivered from the table.

At this point we will describe the delivering turret 96 which is connected with the shaft 95 by a yoke 117 as above described. This is made of angular shape preferably, instead of circular as in the above identified case, and is provided with abutments 97 or recesses for receiving the bottles. The shaft 95 is provided with a cam 118 which operates a roll 99 on an arm 98 which is fixed with respect to a gear segment 119. This gear segment operates a gear segment 101 on an arm 100 which is pivoted at the center of that gear segment to the head 96. This arm is concave in shape and is provided with a plurality of rolls 128 for engaging the bottle. The operation of the arm is similar to the operation of the arm 68 and need not be described in detail.

The frame 42 is provided with a plurality of U-shaped supports 120 which carry at their inner ends a guide 121 for guiding the bottles at the beginning and end of their travel on the table 40. It will be understood that as in the above identified case there are a series of vertical rods 114 which carry bottle clamps 116 at their upper ends, and that these rods are operated to reciprocate vertically and bring the clamps down on the bottles to hold them firmly on the table. For the purpose of providing a support for each bottle the table is provided with openings in which are removable plates 122 of sheet metal. These plates are held in position by screws 123 which have stops 124 adapted to engage a bottle, as indicated in Fig. 8, and located on the table. These stops can be turned around so that pins 125 carried by them can enter other holes 126 and provide for holding bottles of a different size. These plates 122 can be removed and replaced readily so that the wear of the bottles on the table need not be a matter of concern.

We have shown a label clamping member 129 for engaging the labels on the bottles and holding them thereon at the beginning of the operation of the table, but as that does not constitute a part of this invention we are not describing the same or illustrating it in detail. The guide 121 is provided with a pivoted plate 130 pressed by the spring 131 into the position shown in Figs. 4 and 6. A spring is carried by a bracket 132 on the guide 121. The object of this construction is to automatically force any broken bottles off the table and prevent their going through the labeling mechanism. The operation of this will be obvious when attention is called to the fact that the broken bottles are not clamped effectively by the clamp 116 and that the normal bottles are clamped by it so that the plate 130 will be pushed back out of the way by them as they pass from the stationary guide 121.

From what has been said it will be seen that the bottles will be fed around from the feeding conveyer by means of the feeding turret on the table 40 clamped in position and fed around by the table to be operated upon in any desired way. They come back to the turret 96, are released by the clamp 116, taken up by the turret 96, and delivered to the delivering conveyer which delivers them on the table 30 as has been described. It will be seen therefore that means is provided for accurately spacing the bottles apart on the feeding conveyer as they are fed in position to be engaged by the arm 64 and clamped by the arm 68, that the broken bottles and those improperly clamped are discharged, and not fed around on the table, that the others are taken up in proper order and delivered from the machine. One object of the slanting walls 17 on the delivering conveyer frame is to provide a space around each bottle so that corrugated paper covers can be placed on the bottles by hand as they are moving along on this conveyer.

In addition to the advantages above set forth the mechanism shown in this application is of an extremely simple and inexpensive construction so that the cost of the machine is materially reduced and its operation facilitated and the necessity for repairs also very greatly reduced.

Although we have illustrated and described only a single form of the invention we are aware of the fact that modifications can be made therein by any person skilled in the art without departing from the scope of the invention as expressed in the claims. Therefore we do not wish to be limited to all the details of construction herein disclosed or to the application of the invention to any particular article or kind of bottles or its connection with the particular type of rotary labeling table shown in the drawings, but what we do claim is—

1. In a machine of the character described, the combination of a carrier, a turret having a rigid arm thereon for engaging an article fed forward by the carrier, and a relatively movable arm mounted on the turret for holding the article against said rigid arm on the turret with yielding pressure, said movable arm having a yielding end thereon.

2. In a device of the character described, the combination with a carrier, of a rotatable turret mounted in position for feeding articles thereto and provided with a fixed arm thereon and an oscillatably mounted arm, both arms projecting over the carrier as the turret rotates to supply an article thereto, means for oscillating the latter arm periodically as the turret rotates, and a spring-pressed arm pivotally mounted independent of the turret for holding an article against the fixed arm while supported independently of the turret and until engaged by the oscillating arm.

3. In a machine of the character described, the combination of a shaft, a yoke fixed to said shaft, a turret mounted on said shaft, adjustable means for connecting the turret with the yoke to adjust the angular relationship between the turret and the shaft, and means carried by the turret for advancing an article with the turret as it rotates.

4. In a machine of the character described the combination of a table for carrying articles, a deflector located over said table at the beginning of the path of the articles and pivoted at a point inside of the path of the articles and extending outwardly from the pivot across said path, and a spring for normally holding the deflector in a position to cross the path of the articles to move any loose ones off the surface of the moving table as they move along, said spring being adapted to yield to allow any articles fixedly held on the table to pass it.

5. In a machine of the character described, the combination with a rotary table, of means for conveying articles to it, a frame for supporting said conveying means, brackets carried by said frame and projecting over the table, a guide concentric with the table carried by said brackets inside the path of the articles on the table, and a yielding deflector pivoted to said guide and extending outwardly away from it and located in position to engage the articles as they are delivered to said table.

6. In a machine of the character described, the combination with a rotary table, of means for conveying articles to and from it, a frame for supporting said conveying means, brackets carried by said frame and projecting over the table, a guide concentric with the table carried by said brackets inside the path of the articles on the table, means for clamping the articles on the table opposite said guide, and means whereby any article not properly clamped will be forced off the table.

7. In a machine of the character described, the combination of a rotary table for carrying articles, means for clamping the articles to the table, and means for forcing unclamped articles off the table comprising a deflector and a spring for normally moving the deflector into a position to prevent loose articles moving along on the table beyond the deflector but yielding when clamped articles engage it.

8. In a machine of the character described, the combination with a rotary table, of means for conveying articles to it, a frame for supporting said conveying means, brackets carried by said frame and projecting over the table, a guide concentric with the table carried by said brackets inside the path of the articles on the table, a deflector pivoted to the delivering end of said guide in position to engage articles immediately after they are delivered to the table and yielding means for normally forcing said deflector into a position to discharge loose articles from the table as it rotates.

9. The combination of a guideway, a movable arm having a projection thereon, means for positively moving said arm to introduce said projection into the path of the articles in the guideway to stop the same, a latch movable with said arm, and means whereby when said arm moves to its normal limiting position the latch will prevent it from moving back and positively hold the arm in that position, with means for gripping the forward article located in said guideway and moving it therefrom.

10. The combination of a guideway, a movable arm having a projection thereon, means for positively moving said arm to introduce said projection into the path of the articles in the guideway, a latch movable with said arm, and means whereby when said arm moves to its normal limiting position the latch will prevent the arm from moving back, said latch having a projection extending into the path of the articles in the guideway so located as to cause the latch to be released when the last named projection is engaged by an article in the guideway, whereby the arm is rendered capable of moving back to allow an article to proceed in the guideway, with means for gripping the forward article located in said guideway and removing it therefrom.

11. The combination of a guideway, a movable arm having a projection thereon, means for moving said arm to introduce said projection into the path of the articles in the guideway, means whereby when said arm moves to its normal limiting position it will be prevented from moving back, a projection extending into the path of the articles in the guideway so located as to cause the arm to be released when the last named projection is engaged by an article in the guideway, with means for gripping the forward article located in said guideway and removing it therefrom.

12. The combination with a guideway, of an oscillatable shaft, a bracket loosely mounted on said shaft, means for periodically oscillating said bracket, an arm fixed to said shaft, adjustable means on the bracket for engaging said arm and swinging it with the bracket in one direction, yielding means for connecting said arm with the bracket to hold the arm back against said adjustable means, and a projecting end on the arm for moving into the path of the articles in the guideway and stopping them, with means for gripping the forward article located in said guideway and removing it therefrom.

13. The combination with a guideway, of an oscillatable arm, independently movable means for engaging said arm and swinging it over the guideway, yielding means for holding the arm back, a projecting end on the arm for moving into the path of the articles in the guideway and stopping them, and a latch mounted on the arm and adapted to hold the arm in its obstructing position unless an article in the guideway releases the latch, with means for gripping the forward article located in said carrier and removing it therefrom.

14. In a machine of the character described, the combination of a table for carrying articles, a deflector located in the path of the articles normally carried around by the table, and means for normally moving the deflector into position to prevent loose articles moving along on the table beyond the deflector but allowing the deflector to move to a position in which it allows clamped articles to pass it and continue to move around on the table.

In testimony whereof we have hereunto affixed our signatures.

JOHN EMANUEL JOHNSON.
CHARLES H. OSLUND.